United States Patent
Jenkins et al.

(10) Patent No.: US 10,259,154 B2
(45) Date of Patent: Apr. 16, 2019

(54) COEXTRUDED MULTILAYER FILM WITH BETA-PROPYLENE-BASED BARRIER LAYER

(71) Applicant: Dow Global Technologies LLC, Midland, MI (US)

(72) Inventors: Steven R. Jenkins, Traverse City, MI (US); Patrick Chang Dong Lee, Midland, MI (US); Joseph Dooley, Midland, MI (US); Donald E. Kirkpatrick, Lake Jackson, TX (US); Bernard E. Obi, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 83 days.

(21) Appl. No.: 15/314,179

(22) PCT Filed: May 27, 2015

(86) PCT No.: PCT/US2015/032591
§ 371 (c)(1),
(2) Date: Nov. 28, 2016

(87) PCT Pub. No.: WO2015/183898
PCT Pub. Date: Dec. 3, 2015

(65) Prior Publication Data
US 2017/0120495 A1 May 4, 2017

Related U.S. Application Data

(60) Provisional application No. 62/003,270, filed on May 27, 2014.

(51) Int. Cl.
*B32B 7/12* (2006.01)
*B29C 47/00* (2006.01)
(Continued)

(52) U.S. Cl.
CPC ...... *B29C 47/0004* (2013.01); *B29C 47/0021* (2013.01); *B29C 47/065* (2013.01);
(Continued)

(58) Field of Classification Search
CPC ............ B29C 47/0004; B29C 47/0021; B29C 47/065; B29K 2023/12; B29K 2069/00;
(Continued)

(56) References Cited

U.S. PATENT DOCUMENTS 3,557,265 A 1/1971 Chisholm et al.
3,565,985 A 2/1971 Schrenk et al.
(Continued)

FOREIGN PATENT DOCUMENTS

EP 2103426 A1 9/2009
WO 00/76765 A1 12/2000
(Continued)

*Primary Examiner* — Lawrence D Ferguson
(74) *Attorney, Agent, or Firm* — Husch Blackwell LLP

(57) ABSTRACT

The present disclosure provides a coextruded multilayer film The coextruded multilayer film includes a core component having from 15 to 1000 alternating layers of layer A and layer B. Layer A has a thickness from 10 nm to 1000 nm and includes a beta-propylene-based polymer having a crystallization temperature ($T_1c$). Layer B includes a second polymer having a glass transition temperature ($T_2g$), wherein $T_1C<T_2g$. Layer A has an effective moisture permeability less than 6.2 g-mil/m²/24 hrs.

14 Claims, 2 Drawing Sheets

(51) Int. Cl.
*B29D 7/00* (2006.01)
*B32B 27/08* (2006.01)
*B32B 27/32* (2006.01)
*B32B 27/36* (2006.01)
*B29C 47/06* (2006.01)
*B29K 23/00* (2006.01)
*B29K 69/00* (2006.01)
*B29L 7/00* (2006.01)
*B29L 9/00* (2006.01)

(52) U.S. Cl.
CPC ............... *B29D 7/00* (2013.01); *B32B 7/12* (2013.01); *B32B 27/08* (2013.01); *B32B 27/32* (2013.01); *B32B 27/325* (2013.01); *B32B 27/365* (2013.01); *B29K 2023/12* (2013.01); *B29K 2069/00* (2013.01); *B29L 2007/008* (2013.01); *B29L 2009/00* (2013.01); *B32B 2250/05* (2013.01); *B32B 2250/24* (2013.01); *B32B 2270/00* (2013.01); *B32B 2307/412* (2013.01); *B32B 2307/702* (2013.01); *B32B 2307/704* (2013.01); *B32B 2307/7242* (2013.01); *B32B 2307/7246* (2013.01); *B32B 2307/732* (2013.01); *B32B 2439/00* (2013.01); *B32B 2439/60* (2013.01)

(58) Field of Classification Search
CPC ........... B29L 2007/008; B29L 2009/00; B32B 2250/05; B32B 2250/24; B32B 2307/7246; B32B 2439/00; B32B 27/08; B32B 27/32
See application file for complete search history.

(56) References Cited

U.S. PATENT DOCUMENTS

| | | | |
|---|---|---|---|
| 3,884,606 | A | 5/1975 | Schrenk et al. |
| 4,842,791 | A | 6/1989 | Gould et al. |
| 5,094,788 | A | 3/1992 | Schrenk et al. |
| 5,094,793 | A | 3/1992 | Schrenk et al. |
| 6,685,872 | B2 | 2/2004 | Dooley et al. |
| 2007/0084083 | A1 | 4/2007 | Hazenberg et al. |
| 2009/0169853 | A1 | 7/2009 | Chang et al. |
| 2009/0208718 | A1 | 8/2009 | Stoll et al. |
| 2010/0143709 | A1 | 6/2010 | Baer et al. |
| 2013/0161875 | A1 | 6/2013 | Stoll et al. |
| 2014/0363600 | A1 | 12/2014 | Dooley et al. |
| 2016/0144605 | A1 | 5/2016 | Jenkins et al. |

FOREIGN PATENT DOCUMENTS

| | | |
|---|---|---|
| WO | 2008/008875 A2 | 1/2008 |
| WO | 2010/096608 A2 | 8/2010 |

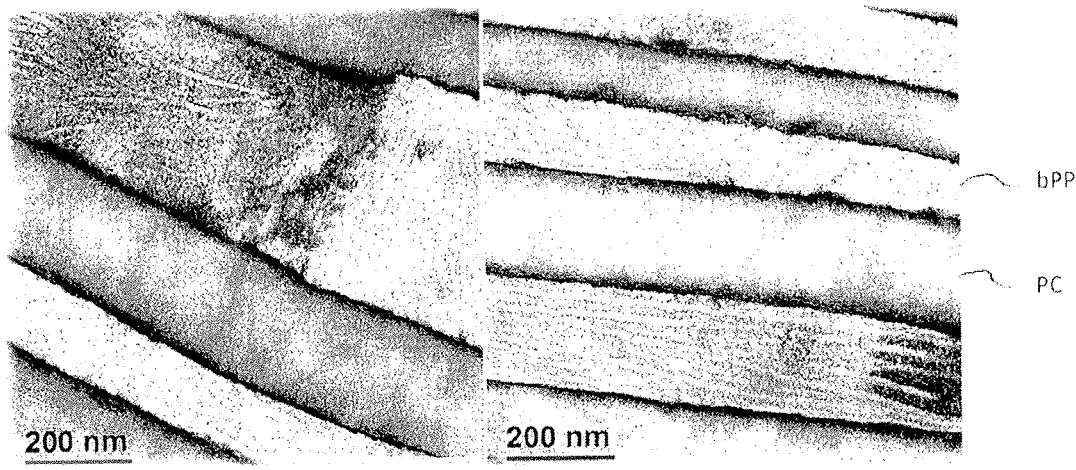
Figure 2. Lamellae structures of PP layers in coextruded microlayer films:
(a) iPP/PC and (b) bPP/PC structures
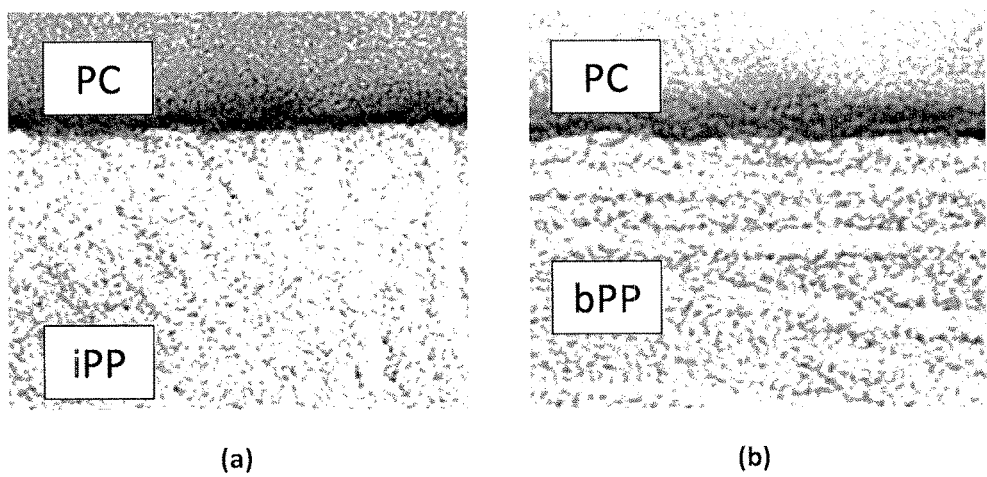
Figure 3. Magnified Views of Lamellae structures near the interface:
(a) iPP/PC and (b) bPP/PC structures

COEXTRUDED MULTILAYER FILM WITH BETA-PROPYLENE-BASED BARRIER LAYER

BACKGROUND

The present disclosure is directed to multilayer films with nanolayer structures that provide barrier properties.

Many applications exist for plastic films or sheets where improved barrier properties would be beneficial. For example, a film with a downgauged overall thickness, utilizing less volume to achieve a given barrier, can provide improved toughness and other properties via the "freed up" volume being used by polymers providing other attributes than barrier.

Consequently, a need exists for films with improved barrier properties. A need further exists for films that enable downgauged packaging systems with improved barrier properties.

SUMMARY

The present disclosure is directed to coextruded multilayer films with a core component that is a nanolayer structure. The nanolayer structure provides the multilayer film with improved barrier properties. By coextruding materials to form a specified nanolayer structure, films or sheets are provided having an unexpected combination of improved moisture barrier and improved gas barrier properties.

In an embodiment, a coextruded multilayer film is provided. The coextruded multilayer film includes a core component having from 15 to 1000 alternating layers of layer A and layer B. Layer A has a thickness from 10 nm to 1000 nm and includes a beta-propylene-based polymer having a crystallization temperature ($T_1c$). Layer B includes a second polymer having a glass transition temperature ($T_2g$), wherein $T_1c<T_2g$.

In an embodiment, Layer A has an effective moisture permeability less than 6.2 g-mil/m²/24 Hours (hrs), where "m²" is meters².

In an embodiment, the second polymer is selected from a polycarbonate and a cyclic olefin polymer.

In an embodiment, the multilayer film includes skin layers.

BRIEF DESCRIPTION OF THE DRAWING

The accompanying figures together with the following description serves to illustrate and provide a further understanding of the disclosure and its embodiments and is incorporated in and constitutes a part of this specification.

FIG. 2 are transmission electron micrographs (TEM) comparing the lamella orientation for a comparative multilayer film to the lamella orientation for a multilayer film in accordance of an embodiment of the present disclosure.

FIG. 3a-3b are TEMs comparing the lamella orientation for a comparative multilayer film (FIG. 3a) to the lamella orientation for a multilayer film (FIG. 3b) in accordance of an embodiment of the present disclosure.

DEFINITIONS

Figure 1:
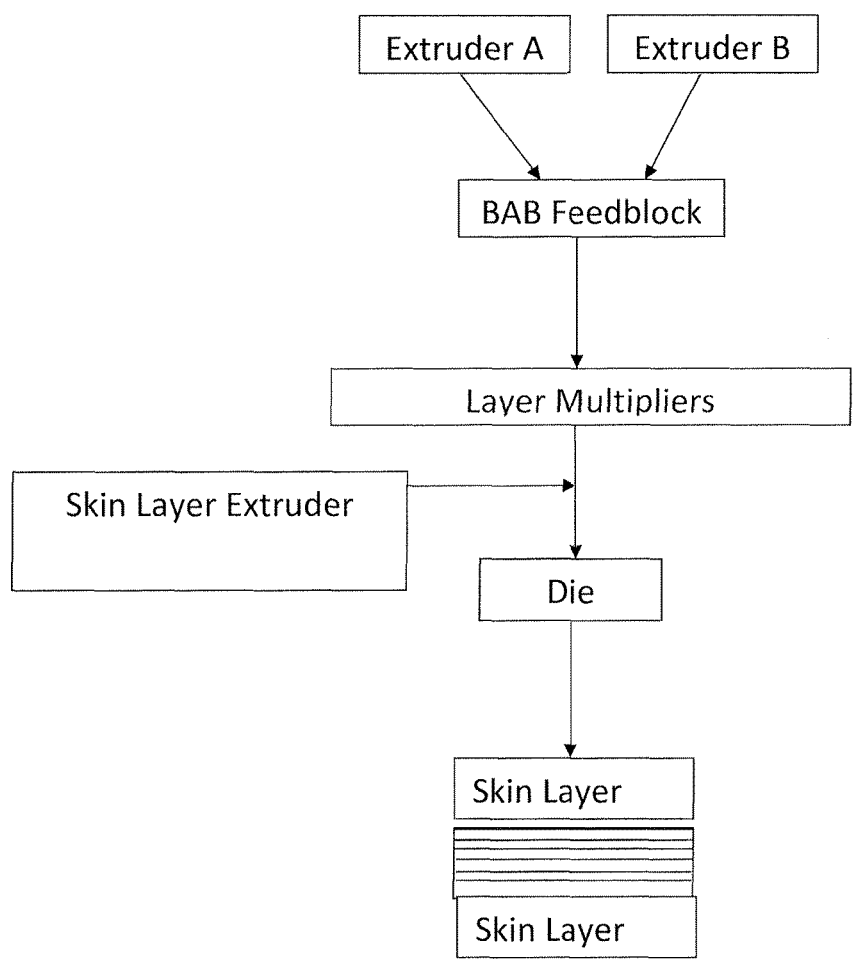
FIG. 1 is a schematic diagram illustrating a method for making a multilayer film or sheet structure in accordance with an embodiment of the present disclosure.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

The term "composition" and like terms mean a mixture of two or more materials, such as a polymer which is blended with other polymers or which contains additives, fillers, or the like. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

An "ethylene-based polymer is a polymer that contains more than 50 mole percent polymerized ethylene monomer (based on the total amount of polymerizable monomers) and, optionally, may contain at least one comonomer.

As used herein, the term "film", including when referring to a "film layer" in a thicker article, unless expressly having the thickness specified, includes any thin, flat extruded or cast thermoplastic article having a generally consistent and uniform thickness up to about 0.254 millimeters (10 mils). "Layers" in films can be very thin, as in the cases of nanolayers discussed in more detail below.

As used herein, the term "sheet", unless expressly having the thickness specified, includes any thin, flat extruded or cast thermoplastic article having a generally consistent and uniform thickness greater than "film", generally at least 0.254 millimeters thick and up to about 7.5 mm (295 mils) thick. In some cases sheet is considered to have a thickness of up to 6.35 mm (250 mils).

Either film or sheet, as those terms are used herein can be in the form of shapes, such as profiles, parisons, tubes, and the like, that are not necessarily "flat" in the sense of planar but utilize A and B layers according to the present disclosure and have a relatively thin cross section within the film or sheet thicknesses according to the present disclosure.

"Interpolymer" is a polymer prepared by the polymerization of at least two different monomers. This generic term includes copolymers, usually employed to refer to polymers prepared from two or more different monomers, and includes polymers prepared from more than two different monomers, e.g., terpolymers, tetrapolymers, etc.

"Melting Point" (Tm) is the extrapolated onset of melting and is determined by DSC as set forth in the "Test Methods" section.

"Crystallization temperature" (Tc) is the extrapolated onset of crystallization and is determined by DSC as set forth in the "Test Methods" section.

"Glass transition temperature" (Tg) is determined from the DSC heating curve as set for in the "Test Methods" section.

A "nanolayer structure," as used herein, is a multilayer structure having two or more layers each layer with a thickness from 1 nanometer to 900 nanometers.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. The term polymer includes trace amounts of impurities, for example catalyst residue, that may be incorporated into and/or within the polymer.

A "propylene-based polymer" is a polymer that contains more than 50 mole percent polymerized propylene monomer (based on the total amount of polymerizable monomers) and, optionally, may contain at least one comonomer.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight.

DETAILED DESCRIPTION

The present disclosure provides a multilayer film. In an embodiment, the multilayer film includes a constraining layer with a solid constraining polymer. A "solid constraining polymer," as used herein is a polymer that solidifies (or vitrifies) from a melt state to a glassy state as indicated by a glass-transition temperature, Tg.

In an embodiment, a coextruded multilayer film is provided and includes a core component. The core component includes from 15 to 1000 alternating layers of layer A and layer B. Layer A has a thickness from 10 nm to 1000 nm and includes a beta-propylene-based polymer having a crystallization temperature ($T_1c$). Layer B (the constraining layer) has a thickness from 10 nm to 1000 nm and includes a second polymer having a glass transition temperature ($T_2g$), wherein $T_1c<T_2g$.

In an embodiment, Layer A has an effective moisture permeability less than 6.2 g-mil/m$^2$/24 hrs. In a further embodiment, layer A has an effective moisture permeability from 0 or 1.55, or 3.1 to 4.7, or less than 6.2 g-mil/m$^2$/24 hr.

A. Layer A

The core component of the present multilayer film includes from 15 to 1000 alternating layers of layer A and layer B. Layer A includes a beta-propylene-based polymer.

In an embodiment, the beta-propylene-based polymer is a beta-propylene homopolymer. Isotactic propylene homopolymer is capable of crystallizing in several crystal forms. Besides the amorphous phase, three different crystalline phases, the α-, β- and γ-phases, of propylene homopolymer are known. When melted propylene homopolymer cools, the alpha or monoclinic crystalline form is the most stable and prevalent one. The beta or hexagonal form is typically found at low levels.

The relative proportion ("K") of beta form crystalline in the quiescently crystallized polypropylene specimen can be determined by X-ray diffraction and expressed by the empirical expression:

$$K = \frac{H_\beta}{H_\beta + H_{110} + H_{040} + H_{130}}$$

wherein $H_{110}$, $H_{040}$ and $H_{130}$ are the heights of the three strong peaks (110), (040) (130) of the alpha-form respectively and $H_\beta$ is the height of the strong beta-peak (300). The K value is 0 in the absence of the beta-form and 1 if only the beta-form is present in the polypropylene.

A "beta-propylene-homopolymer," as used herein, (hereafter referred to as "bPP"), is an isotactic propylene homopolymer with a β-crystalline content of at least 50% (i.e., a K value of 0.5 or more).

In an embodiment, the bPP has a β-crystalline content from 60% (K value 0.6), or 70% (K value 0.7), or 80% (K value 0.8), to 85% (K value 0.85), or 90% (K value 0.9), or 95% (K value 0.95), or 99% (K value 0.99), or 100% (K value 1.0).

The bPP is distinguishable over the conventional alpha-crystalline form of isotactic propylene homopolymer. The bPP has a lower melting point, Tm, in the range of 148° C. to 150° C., compared to conventional isotactic polypropylene (α-crystalline), which has a melting point of 160° C. The bPP has improved toughness and improved impact strength when compared to conventional isotactic propylene homopolymer (α-crystalline).

In an embodiment, the bPP is produced by melt blending an isotactic propylene homopolymer with a beta-nucleator. Nonlimiting examples of suitable beta-nucleator include γ-quinacridone; aluminum salt of quinizarin sulphonic acid; disodium-phthalate; calcium-phthalate; dihydroquinoacridin-dione; quinacridin-tetrone; triphenol ditriazine; calcium stearate+pimelic acid; calcium silicate; calcium, zinc and barium salts of polycarboxilic acids; δ-quinacridone; diamides of adipic or/and suberic acids; calcium salts of suberic or pimelic acid; indigosol and cibantine organic pigments; quinacridone quinone; N',N'-dicyclohexil-2,6-naphthalene dicarboxamide; antraquinon red and bis-azo yellow pigment.

In an embodiment, the beta-nucleator is quinacridonequinonene.

In an embodiment, the bPP has one, some, or all of the following properties:
  (i) a melt flow rate (MFR) from 0.1 g/10 min, or 0.5 g/10 min to 25 g/10 min, or 50 g/10 min;
  (ii) a crystallization temperature, $T_1c$, from 100° C. to 130° C.;
  (iii) a density from 0.89 g/cc to 0.91 g/cc; and
  (iv) a K-value from 0.90, or 0.91, or 0.93 to 0.95, or 0.97, or 0.99.

In an embodiment, the bPP has a K-value from 0.90, or 0.91, or 0.93, or 0.95 to 0.97, or 0.98, or 0.99 and has a $T_c$ from 100° C., or 105° C., or 110° C., or 115° C. to 120° C., or 125° C., or 130° C.

In an embodiment, Layer A includes an impact propylene copolymer. The propylene impact copolymer is heterophasic, having a continuous phase and a discontinuous phase. The bPP is the continuous phase and a propylene/ethylene copolymer is the discontinuous phase. In another embodiment, the discontinuous phase is an elastomer or plastomer of ethylene copolymer such as AFFINITY or ENGAGE polymers sold by The Dow Chemical Company.

B. Layer B

The core component of the present multilayer film includes from 15 to 1000 alternating layers of layer A and layer B. Layer B has a thickness from 10 nm to 1000 nm and includes a second polymer having a glass transition temperature ($T_2g$). The second polymer is selected such that crystallization temperature, $T_1c$, of the bPP in layer A is less than the glass transition temperature ($T_2g$), for the second polymer of layer B.

The relationship between the crystallization temperature, $T_1c$, for the bPP in layer A and the glass transition temperature, $T_2g$, for the second polymer in layer B is:

$$T_1c < T_2g$$

wherein $T_1c$ and $T_2g$ each is degrees Centigrade (° C.).

In an embodiment, $T_2g - T_1c$ is greater than 20° C., or greater than 25° C., or greater than 30° C., or greater than 35° C., or greater than 40° C., or greater than 45° C.

In an embodiment, the second polymer for layer B is selected from a polycarbonate and a cyclic olefin polymer.

i. Polycarbonate

In an embodiment, the second polymer of layer B includes a polycarbonate. A "polycarbonate," as used herein, is a thermoplastic resin derived from a diphenol, phosgene, and a linear polyester of a carbonic acid. The polycarbonate can be a homopolycarbonate, a copolycarbonate, or an aromatic polycarbonate.

In an embodiment, the polycarbonate is an aromatic polycarbonate. The preparation of aromatic polycarbonate can be carried out, for example, by reaction of a diphenol with carbonic acid halide, preferably phosgene, and/or with aromatic dicarboxylic acid dihalide, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerization process by reaction of diphenols with, for example, diphenyl carbonate is also possible.

Aromatic polycarbonates typically have mean weight-average molecular weights ($M_w$, measured, for example, by GPC, ultracentrifugation or scattered light measurement) of from 10,000 to 20,000 g/mol, or from 15,000 to 80,000 g/mol, or from 24,000 to 32,000 g/mol.

The aromatic polycarbonate can be branched by the incorporation of from 0.05 to 2.0 mol %, based on the sum of the diphenols used, of compounds having a functionality of three, or more than three phenolic groups.

In an embodiment, the aromatic polycarbonate has a density from 1.0 g/cc to 2.0 g/cc, and an MFR from 15 g/10 min to 20 g/10 min.

In an embodiment, the polycarbonate is a copolycarbonate.

The copolycarbonate can be formed from bisphenol A with up to 15 mol %, based on the molar sums of diphenols, 2,2-bis(3,5-dibromo-4-hydroxyphenyl)-propane. It is also possible to use from 1 to 25 wt %, or from 2.5 to 25 wt %, based on the total amount of diphenols to be used, of polydiorganosiloxanes having hydroxyaryloxy end groups.

In an embodiment, the polycarbonate is a homopolycarbonate. The diphenol is bisphenol A.

In an embodiment, the multilayer film includes layer A having a bPP with a $T_1c$ from 100° C. to 130° C. The bPP has a MFR from 1.5 g/10 min to 2.5 g/10 min. Layer B includes a polycarbonate with a $T_2g$ greater than 130° C., or greater than 135° C., or greater than 140° C., or greater than 145° C., or greater than 150° C., or greater than 155° C., or greater than 160° C., or greater than 170° C. In a further embodiment, (polycarbonate) $T_2g - T_1c$ (bPP) is greater than 40° C.

ii. Cyclic Olefin Polymer

The core component of the present multilayer film includes from 15 to 1000 alternating layers of layer A and layer B. In an embodiment, the second polymer of layer B includes a cyclic olefin polymer. A "cyclic olefin polymer (or "COP") is an olefin-based polymer that includes a saturated hydrocarbon ring. Suitable COPs include at least 25 wt % cyclic units, which weight percentage is calculated based on the weight percentage of the olefin monomer units containing, including functionalized to contain, the cyclic moiety ("MCCM") that is polymerized into the COP as a percentage of the total weight of monomers polymerized to form the final COP.

A "cyclic olefin polymer (or "COP") is an olefin-based polymer that includes a saturated hydrocarbon ring. Suitable COPs include at least 25 wt % cyclic units, which weight percentage is calculated based on the weight percentage of the olefin monomer units (which may be functionalized) containing the cyclic moiety ("MCCM") that is polymerized into the COP as a percentage of the total weight of monomers polymerized to form the final COP.

In an embodiment, the COP includes at least 40 wt %, or at least 50 wt % or at least 75 wt % MCCM. The cyclic moiety can be incorporated in the backbone of the polymer chain (such as from a norbornene ring-opening type of polymerization) and/or pendant from the polymer backbone (such as by polymerizing styrene (which is eventually hydrogenated to a cyclic olefin) or other vinyl-containing cyclic monomer). The COP can be a homopolymer based on a single type of cyclic unit; a copolymer comprising more than one cyclic unit type; or a copolymer comprising one or more cyclic unit type and other incorporated monomer units that are not cyclic, such as units provided by or based on ethylene monomer. Within copolymers, the cyclic units and other units can be distributed in any way including randomly, alternately, in blocks or some combination of these. The cyclic moiety in the COP need not result from polymerization of a monomer comprising the cyclic moiety per se but may result from cyclicly functionalizing a polymer or other reaction to provide the cyclic moiety units or to form the cyclic moiety from a cyclic moiety precursor. As an example, styrene (which is a cyclic moiety precursor but not a cyclic unit for purposes of this disclosure) can be polymerized to a styrene polymer (not a cyclic olefin polymer) and then later be completely or partially hydrogenated to result in a COP.

The MCCMs which can be used in polymerization processes to provide cyclic units in COP's include but are not limited to norbornene and substituted norbornenes. As mentioned above, cyclic hexane ring units can be provided by hydrogenating the styrene aromatic rings of styrene polymers. The cyclic units can be a mono- or multi-cyclic moiety that is either pendant to or incorporated in the olefin polymer backbone. Such cyclic moieties/structures include cyclobutane, cyclohexane or cyclopentane, and combinations of two or more of these. For example, cyclic olefin polymers containing cyclohexane or cyclopentane moieties are α-olefin polymers of 3-cyclohexyl-1-propene (allyl cyclohexane) and vinyl cyclohexane.

In an embodiment, the COP is a cyclic olefin block copolymers (or "CBC") prepared by producing block copolymers of butadiene and styrene that are then hydrogenated, preferably fully hydrogenated, to a CBC. Nonlimiting examples of suitable CBC include CBC that is fully hydrogenated di-block (SB), tri-block (SBS) and penta-block (SBSBS) polymer. In such tri- and penta-block copolymer, each block of a type of unit is the same length; i.e., each S block is the same length and each B block is the same length. Total molecular weight (Mn) prior to hydrogenation is from about 25,000 to about 1,000,000 g/mol. The percent of styrene incorporated is from 10 to 99 wt %, or from 50 to 95 wt % or from 80 to 90 wt %, the balance being butadiene.

For example, WO2000/056783(A1), incorporated by reference herein, discloses the preparation of such pentablock types of COPs.

Other COPs are described in Yamazaki, Journal of Molecular Catalysis A: Chemical, 213 (2004) 81-87; and Shin et al., Pure Appl. Chem., Vol. 77, No. 5, (2005) 801-814. In the publication from Yamazaki (of Zeon Chemical) the polymerization of a COP is described as based on a ring opening metathesis route via norbornene. Commercially available COP products from Zeon Chemical are described as an amorphous polyolefin with a bulky ring structure in the main chain, based on dicyclopentadiene as the main monomer and saturating the double bond in norbornene ring-opening metathesis with a substituent (R) by hydrogenation. A nonlimiting example of a suitable is COP is Zeonor 1420 sold by Zeon Chemical.

Another example of COPs are the Topas brand cyclic olefin copolymers commercially available from Topas Advanced Polymers GmbH which are amorphous, transparent copolymers based on cyclic olefins (i.e., norbornene) and linear olefins (e.g., ethylene), with heat properties being increased with higher cyclic olefin content. Preferably such COP s are represented by the following formula with the x and y values selected to provide suitable thermoplastic polymers:

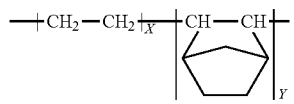

The layers comprising the COPs can be made from COPs or can comprise physical blends of two or more COPs and also physical blends of one or more COP with polymers that are not COPs provided that any COP blends or compositions comprise at least 25 wt % cyclic olefin unit content in the total blend or composition.

In an embodiment, layer B includes a cyclic block copolymer.

In an embodiment, layer B includes a cyclic block copolymer that is a pentablock hydrogenated styrene.

In an embodiment, the multilayer film includes layer A having a beta-propylene-homopolymer with a $T_1c$ from 100° C. to 130° C. The propylene homopolymer has a MFR from 1.5 g/10 min to 2.5 g/10 min. Layer B includes a COP with a $T_2g$ greater than 130° C., or greater than 135° C., or greater than 140° C. In a further embodiment, the (COP) $T_2g-T_1c$ (propylene homopolymer) is greater than 10° C., or greater than 20° C., or greater than 30° C.

C. Core Component

The core component of the present multilayer film includes from 15 to 1000 alternating layers of layer A and layer B.

In an embodiment, the core component includes from 15, or 30, or 33, or 50, or 60, or 65, or 70, or 100, or 129, or 145, or 150, or 200 to 250, or 257, or 300, or 400, or 450, or 500, or 1000 alternating layers of layer A and layer B.

The thickness of layer A and layer B can be the same or different. In an embodiment, the thickness of layer A is the same, or substantially the same, as the thickness of layer B. Layer A has a thickness from 10 nm, or 20 nm, or 30 nm, or 50 nm, or 70 nm, or 80 nm, or 100 nm, or 145 nm, or 150 nm, or 198 nm, or 200 nm, or 250 nm, or 290 nm, or 300 nm, or 350 nm, 396 nm, or 400 nm, or 450 nm to 500 nm, or 600 nm, or 700 nm, or 792 nm, or 800 nm, or 900 nm, or 1000 nm. Layer B has a thickness from 10 nm, or 20 nm, or 30 nm, or 50 nm, or 70 nm, or 80 nm, or 100 nm, or 145 nm, or 150 nm, or 198 nm, or 200 nm, or 250 nm, or 290 nm, or 300 nm, or 350 nm, or 396 nm, or 400 nm, or 450 nm to 500 nm, or 600 nm, or 700 nm, or 792 nm, or 800 nm, or 900 nm, or 1000 nm.

The number of A layers and B layers present in the core component can be the same or different. In an embodiment, the A:B layer ratio (number of A layers to the number of B layers) is from 1:1, or 3:1, to 9:1.

In an embodiment, the core component includes 200 to 300, or 257 alternating layers of layer A and layer B and the core component has an A:B layer ratio from 50:50, or 75:25 to 90:10. Layer A has a thickness from 30 nm, or 100 nm, or 200 nm to 400 nm, or 500 nm.

The core component may be produced with a multilayer coextrusion apparatus as illustrated in FIG. 1. The feedblock for a multi-component multilayer system usually combines the polymeric components into a layered structure of the different component materials. The starting layer thicknesses (their relative volume percentages) are used to provide the desired relative thicknesses of the A and B layers in the final film.

The present core component is a two component structure composed of polymeric material "A" (produces layer A) and polymeric material "B" (produces layer B) and is initially coextruded into a starting "AB" or "ABA" layered feedstream configuration where "A" represents layer A and "B" represents layer B. Then, known layer multiplier techniques can be applied to multiply and thin the layers resulting from the feedstream. Layer multiplication is usually performed by dividing the initial feed stream into 2 or more channels and "stacking" of the channels. The general formula for calculation of the total numbers of layers in a multilayer structure using a feedblock and repeated, identical layer multipliers is: $N_t=(N_I)(F)^n$ where: $N_t$ is the total number of layers in the final structure; $N_I$ is the initial number of layers produced by the feedblock; F is the number of layer multiplications in a single layer multiplier, usually the "stacking" of 2 or more channels; and n is number of identical layer multiplications that are employed.

For multilayer structures of two component materials A and B, a three layer ABA initial structure is frequently employed to result in a final film or sheet where the outside layers are the same on both sides of the film or sheet after the layer multiplication step(s). Where the A and B layers in the final film or sheet are intended to be generally equal thickness and equal volume percentages, the two A layers in the starting ABA layer structure are half the thickness of the B layer but, when combined together in layer multiplication, provide the same layer thickness (excepting the two, thinner outside layers) and comprise half of the volume percentage-wise. As can be seen, since the layer multiplication process divides and stacks the starting structure multiple times, two outside A layers are always combined each time the feedstream is "stacked" and then add up to equal the B layer thickness. In general, the starting A and B layer thicknesses (relative volume percentages) are used to provide the desired relative thicknesses of the A and B layers in the final film. Since the combination of two adjacent, like layers appears to produce only a single discrete layer for layer counting purposes, the general formula $N_t=(2)^{(n+1)}+1$ is used for calculating the total numbers of "discrete" layers in a multilayer structure using an "ABA" feedblock and repeated, identical layer multipliers where $N_t$ is the total number of layers in the final structure; 3 initial layers are produced by the feedblock; a layer multiplication is division into and stacking of 2 channels; and n is number of identical layer multiplications that are employed.

A suitable two component coextrusion system (e.g., repetitions of "AB" or "ABA") has two ¾ inch single screw extruders connected by a melt pump to a coextrusion feedblock. The melt pumps control the two melt streams that are combined in the feedblock as two or three parallel layers in a multilayer feedstream. Adjusting the melt pump speed varies the relative layer volumes (thicknesses) and thus the thickness ratio of layer A to layer B. From the feedblock, the feedstream melt goes through a series of multiplying elements. It is understood that the number of extruders used to pump melt streams to the feedblock in the fabrication of the structures of the disclosure generally equals the number of different components. Thus, a three-component repeating segment in the multilayer structure (ABC . . . ), requires three extruders.

Examples of known feed block processes and technology are illustrated in WO 2008/008875; U.S. Pat. Nos. 3,565,985; 3,557,265; and 3,884,606, each of which is hereby incorporated by reference herein. Layer multiplication process steps are shown, for example, in U.S. Pat. Nos. 5,094,788 and 5,094,793, hereby incorporated herein by reference, teaching the formation of a multilayer flow stream by dividing a multilayer flow stream containing the thermoplastic resinous materials into first, second and optionally other substreams and combining the multiple substreams in a stacking fashion and compressing, thereby forming a multilayer flow stream. As may be needed depending upon materials being employed for film or sheet production and the film or sheet structures desired, films or sheet comprising two or more layers of the multilayer flow stream can be provided by encapsulation techniques such as shown by U.S. Pat. No. 4,842,791 encapsulating with one or more generally circular or rectangular encapsulating layers stacked around a core; as shown by of U.S. Pat. No. 6,685,872 with a generally circular, nonuniform encapsulating layer; and/or as shown by WO 2010/096608A2 where encapsulated multilayered films or sheet are produced in an annular die process. U.S. Pat. Nos. 4,842,791 and 6,685,872 and WO 2010/096608A2 are hereby incorporated by reference herein.

In an embodiment, the core component includes from 15 to 1000 alternating layers of layer A and layer B. Layer A has a thickness from 10 nm, or 50 nm, or 100 nm to 500 nm and includes the bPP with $T_1c$ as disclosed above. Layer B includes the second polymer, either a polycarbonate or a COP, with $T_2g$ as disclosed above. Layer A has an effective moisture permeability from 1.0 to less than 6.2 g-mil/m²/24 hrs.

In an embodiment, layer A of the core component includes a bPP with a $T_1c$ from 100° C. to 130° C. In a further embodiment, the beta-propylene-homopolymer has a melt flow rate from 1.5 g/10 min to 2.5 g/10 min.

In an embodiment, the second polymer in the core component is selected from a polycarbonate and a cyclic olefin polymer.

In an embodiment, layer A of the core component includes a bPP with a $T_1c$ from 100° C. to 130° C. and a melt flow rate from 1.5 g/10 min to 2.5 g/10 min. Layer B includes a polycarbonate with a $T_2g$ greater than 130° C., or greater than 140° C., or greater than 150° C. In a further embodiment, the $T_2g$ (polycarbonate)–$T_1c$ (bPP) is greater than 20° C. or greater than 30° C., or greater than 40° C.

In an embodiment, layer A has a thickness of 100 nm to 200 nm and layer A includes the bPP with $T_1c$ from 100° C. to 130° C. as disclosed above. Layer B includes the polycarbonate with $T_2g$ greater than 130° C. as disclosed above. Layer A has an effective moisture permeability from 1.0 to less than 6.2 g-mil/m²/24 hrs.

In an embodiment, layer A has a thickness from 10 nm to 50 nm and layer A includes bPP with A $T_1c$ from 100° C. to 130° C. as disclosed above. Layer B has a thickness from 10 nm to 50 nm and includes polycarbonate with A $T_2g$ greater than 150° C. Layer A has an effective moisture permeability from 0.5 to less than 5.0 g-mil/m2/24 hrs.

In an embodiment, the core component has layer A which includes the bPP with a $T_1c$ from 100° C. to 130° C. as disclosed above. Layer B includes a cyclic olefin polymer with a $T_2g$ greater than 130° C. In a further embodiment, the $T_2g$ (COP)–$T_1c$ (bPP) is greater than 20° C. In yet a further embodiment, the cyclic olefin polymer is a cyclic block copolymer.

In an embodiment, layer A has a thickness from 100 nm to 200 nm and layer A includes the bPP with $T_1c$ from 100° C. to 130° C. as disclosed above. Layer B includes the a cyclic block copolymer with $T_2g$ greater than 130° C. as disclosed above. Layer A has an effective moisture permeability from 3.0 to less than or equal to 6.2 g-mil/m²/day.

In an embodiment, the core component has a total thickness from 0.1 mil to 10.0 mil. In a further embodiment, the core component has a thickness from 0.1 mil, or 0.2 mil, or 0.3 mil, or 0.4 mil, or 0.5 mil to 0.8 mil, or 1.0 mil, or 1.5 mil, or 2.0 mil, or 3.0 mil, or 5.0 mil, or 7.7 mil, or 10.0 mil.

The core component may comprise two or more embodiments disclosed herein.

D. Skin Layers

In an embodiment, the multilayer film includes two skin layers. The skin layers are outermost layers, with a skin layer on each side of the core component. The skin layers oppose each other and sandwich the core component. The composition of each individual skin layer may be the same or different as the other skin layer. Nonlimiting examples of suitable polymers that can be used as skin layers include propylene-based polymer, ethylene-based polymer, oxide, polycaprolactone, polyamides, polyesters, polyvinylidene fluoride, polystyrene, polycarbonate, polymethylmethacrylate, polyamides, ethylene-co-acrylic acid copolymers, polyoxymethylene and blends of two or more of these; and blends with other polymers comprising one or more of these.

In an embodiment, the skin layers include propylene-based polymer, ethylene-based polymer ethylene homopolymer, ethylene copolymer, propylene homopolymer, propylene copolymer, polyamide, polystyrene, polycarbonate and polyethylene-co-acrylic acid copolymers.

The thickness of each skin layer may be the same or different. The two skin layers have a thickness from 5%, or 10%, or 15% to 20%, or 30%, or 35% the total volume of multilayer film.

In an embodiment, the thickness of the skin layers is the same. The two skin layers with the same thickness are present in multilayer film in the volume percent set forth above. For example, a multilayer film with 35% skin layer indicates each skin layer is present at 17.5% the total volume of the multilayer film.

In an embodiment, the composition of each skin layer is the same and each skin layer is a propylene-based polymer. In a further embodiment, each skin layer is the same beta-propylene-homopolymer as the beta-propylene-homopolymer that is present in layer A.

In an embodiment, each skin layer includes a bPP. The bPP for each skin layer has a MFR from 0.1 g/10 min, or 0.5 g/10 min, or 1.0 g/10 min, or 1.5 g/10 min, to 2.0 g/10 min, or 2.5 g/10 min. The bPP has a density from 0.89 g/cc to 0.91 g/cc. The bPP has a crystallization temperature ($T_1c$) from 100° C. to 130° C.

E. Optional Other Layer

The skin layers may be in direct contact with the core component (no intervening layers). Alternatively, the multilayer film may include one or more intervening layers between each skin layer and the core component. The present multilayer film may include optional additional layers. The optional layer(s) may be intervening layers (or internal layers) located between the core component and the skin layer(s). Such intervening layers (or internal layers) may be single, repeating, or regularly repeating layer(s). Such optional layers can include the materials that have (or provide) sufficient adhesion and provide desired properties to the films or sheet, such as tie layers, barrier layers, skin layers, etc.

Nonlimiting examples of suitable polymers that can be employed as tie or adhesive layers include: polar ethylene copolymers such as copolymers with vinyl acetate, acrylic acid, methyl acrylate, and ethyl acrylate; ionomers; maleic anhydride-grafted ethylene polymers and copolymers; blends of two or more of these; and blends with other polymers comprising one or more of these.

Nonlimiting examples of suitable polymers that can be employed as barrier layers include: polyethylene terephthalate, ethylene vinyl alcohol, polyvinylidene chloride copolymers, polyamides, polyketones, MXD6 nylon, blends of two or more of these; and blends with other polymers comprising one or more of these.

As noted above, the multilayer film according to the present disclosure can be advantageously employed as a component in thicker structures having other inner layers that provide structure or other properties in the final article. For example, the skin layers can be selected to have an additional desirable properties such as toughness, printability and the like are advantageously employed on either side of the core component to provide films suitable for packaging and many other applications where their combinations of moisture barrier, gas barrier, physical properties and low cost will be well suited. In another aspect of the present disclosure, tie layers can be used with the multilayer film or sheet structures according to the present disclosure.

F. Multilayer Film

The multilayer film of the present disclosure can be a stand-alone film or can be a component of another film, a laminate, a sheet, or an article.

The present multilayer film may be used as films or sheets for various known film or sheet applications or as layers in thicker structures and to maintain light weight and low costs.

When employed in this way in a laminate structure or article with outer surface or skin layers and optional other inner layers, the present multilayer film can be used to provide at least 5 volume % of a desirable film or sheet, including in the form of a profile, tube, parison or other laminate article, the balance of which is made up by up to 95 volume % of additional outer surface or skin layers and/or inner layers.

In an embodiment, the present multilayer film provides at least 10 volume %, or at least 15 volume %, or at least 20 volume %, or at least 25 volume %, or at least 30 volume % of a laminate article.

In an embodiment, the present multilayer film provides up to 100 volume %, or less than 80 volume %, or less than 70 volume %, or less than 60 volume %, or less than 50 volume % of a laminate article.

For nanolayer structures, two relationships exist which influence barrier property—(i) crystal lamella orientation and (ii) % crystallinity. It is known that the thinner the nanolayer becomes, the morphology moves from spherulitic with an overall random orientation of lamellae but containing some of which are in the edge-on orientation, to in-plane lamellae. However, orientation is inversely related to crystallinity, such that as confinement increases (barrier becomes thinner), the degree of crystallinity for the barrier polymer decreases, reducing barrier capability. Moreover, many barrier resins do not form "in-plane" lamellae crystals upon confinement and only drop in percent crystallinity, and thus deteriorate the barrier property. Therefore, for many barrier materials, it is necessary to maintain overall percent crystallinity as high as possible and reduce the portions of "edge-on" lamellae in the spherulitic crystals.

Bounded by no particular theory, Applicant discovered that creation of truncated spherulites in nanolayer structures unexpectedly optimizes barrier capability. With (1) control of layer thickness and (2) selection of barrier and constraining components, nanolayer with truncated spherulite morphology can be obtained which exhibit unexpected barrier improvement to moisture permeability and gas permeability.

A "spherulite" is a superstructure observed in many semi-crystalline polymers and is composed of branched crystal lamella radiating from a central nucleation point. If spherulite growth is not confined, the spherulite grows in the radial direction symmetrically as a sphere until it impinges on other spherulites. The lamella direction in the spherulite is, on average, random. A "truncated spherulite" is a spherulite that is confined in at least one dimension by the thickness of the film from which it is grown. If the film is grown in the horizontal plane, growth is terminated at the top and the bottom (perpendicular to horizontal plane) while growth more parallel to the film continues as in the unconfined example, until another spherulite (also truncated by the constraining layer) is encountered. The truncated spherulite is not symmetric and the lamella orientation is, on average, no longer random. A truncated spherulite is formed by eliminating a top portion and a bottom portion of the spherulite with opposing constraining layers. A truncated spherulite has lamella with a more perpendicular component to its direction, relative to the horizontal plane of the film.

Bounded by no particular theory, Applicant discovered that creation of truncated spherulites in nanolayer structures unexpectedly optimizes barrier capability. With (1) control of layer thickness and (2) selection of barrier and constraining components, nanolayer with truncated spherulite orientation can be obtained which exhibit unexpected barrier improvement to both effective moisture permeability and effective oxygen permeability.

As a benchmark, polyethylene oxide (PEO) barrier shows a relationship of starting at a low permeation rate with the thinnest layers due to in-plane crystal lamella, and then rising to the permeation rate of bulk polymer as layer thickness increases.

In contrast, for polyethylene it is known that at small layer thickness in nanolayer film, edge-on crystal lamella are present which do not yield a decrease in permeation rate over that of the bulk. See for example Pan et al, J. Polym. Sci., Polym. Phys., 28 1105 (1990).

Applicant discovered isotactic propylene homopolymer (barrier polymer layer A) exhibits a cross-hatch nucleation mechanism. A "cross-hatch nucleation" occurs when a lamella in one direction nucleates a lamella substantially perpendicular, or perpendicular, to it. For example, cross-hatch nucleation creates "edge-on" lamellae structure from in-plane lamella. Applicant found, that bPP suppresses cross hatch nucleation in iPP to create in-plane lamella and/or truncated spherulitic crystals. The beta-crystalline structure of the bPP reduces the length of lamellae in the "edge-on" direction, thereby increasing the ratio of in-plane lamella to edge-on lamella. Applicant unexpectedly discovered a nanolayer configuration whereby bPP exhibits optimal barrier properties with layer thickness from 10 nm to 1000 nm and 10 nm to 200 nm, in particular. Thus, three features (i) the provision of barrier layer bPP (ii) constrained to 10 nm-200 nm by (iii) the use of PC or COP as constraining layers work synergistically to unexpectedly improve the barrier property and reduce both effective moisture permeability and effective oxygen permeability of the core component.

G. Article

The present disclosure provides an article. In an embodiment, the present multilayer film is a component of an article. Nonlimiting examples of suitable articles include laminate structures, die formed articles, thermoformed articles, vacuum formed articles, or pressure formed articles. Other articles include tubes, parisons, and blow molded articles such as bottles or other containers.

Test Methods

Percent crystallinity, melting temperature, Tm, crystallization temperature (Tc), and glass transition temperature (Tg), each is measured by way of Differential Scanning calorimetry (DSC) as set forth below.

DSC

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the Equation below:

% Crystallinity=(($H_f$)/292 J/g)×100

The heat of fusion ($H_f$) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in B. Wunderlich in *Thermal Characterization of Polymeric Materials*, $2^{nd}$ edition, Academic Press, 1997, E. Turi ed., pgs 277 and 278.

Crystallization temperature, Tc, is determined from a DSC cooling curve as above except the tangent line is drawn on the high temperature side of the crystallization peak. Where this tangent intersects the baseline is the extrapolated onset of crystallization (Tc).

Glass transition temperature, Tg, is determined from the DSC heating curve where half the sample has gained the liquid heat capacity as described in B. Wunderlich in *Thermal Characterization of Polymeric Materials*, $2^{nd}$ edition, Academic Press, 1997, E. Turi ed., pg 278 and 279. Baselines are drawn from below and above the glass transition region and extrapolated through the Tg region. The temperature at which the sample heat capacity is half-way between these baselines is the Tg.

Density is measured in accordance with ASTM D 792.

Effective permeability (Peff) is calculated as disclosed in W. J. Schrenk and T. Alfrey, Jr., POLYMER ENGINEERING AND SCIENCE, November 1969, Vol. 9, No. 6; pp. 398-399; see also Wang et al., Confined Crystallization of Polyethylene Oxide in Nanolayer Assemblies, Science, 6 Feb. 2009, Vol. 323 no. 5915 pp. 757-760 DOI: 10 1126/science 1164601. The effective permeability (moisture and oxygen) for an individual barrier layer is calculated using Equation (I) as follows:

$$P_{B,eff} = V_B \left( \frac{1}{P} - \frac{1-V_B}{P_c} \right)^{-1} \qquad \text{Equation I}$$

wherein P is the permeability of the nanolayer component, $V_B$ and $V_C$ are the volume fraction of the barrier and confining polymers, respectively, and $P_C$ are the permeability of the barrier and confining polymers, respectively. Effective moisture permeability is measured as g-mil/m²/24 hrs.

Melt flow rate (MFR) is measured in accordance with ASTM D 1238, Condition 280° C./2.16 kg (g/10 minutes).

Melt index (MI) is measured in accordance with ASTM D 1238, Condition 190° C./2.16 kg (g/10 minutes).

Moisture permeability is a normalized calculation performed by first measuring Water Vapor Transmission Rate (WVTR) for a given film thickness. WVTR is measured at 38° C., 100% relative humidity and 1 atm pressure are measured with a MOCON Permatran-W 3/31. The instrument is calibrated with National Institute of Standards and Technology certified 25 μm-thick polyester film of known water vapor transport characteristics. The specimens are prepared and the WVTR is performed according to ASTM F1249. Unit for WVTR is gram (g)/square meter (m²)/day (24 hr), or g/m²/24 hr.

Oxygen permeability is a normalized calculation performed by first measuring Oxygen Transmission Rate (OTR) for a given film thickness. OTR is measured at 23° C., 0% relative humidity and 1 atm pressure are measured with a MOCON OX-TRAN 2/20. The instrument is calibrated with National Institute of Standards and Technology certified Mylar film of known $O_2$ transport characteristics. The specimens are prepared and the OTR is performed according to ASTM D 3985. Some embodiments of the present disclosure will now be described in detail in the following Examples. Unit for OTR is cubic centimeter (cc)/square meter (m²)/day (24 hr), or cc/m²/24 hr.

Some embodiments of the present disclosure will now be described in detail in the following Examples.

EXAMPLES

Multilayer films are prepared with barrier layer made from either isotactic propylene homopolymer (alpha crystalline structure) iPP (comparative) or bPP (inventive) coextruded with polycarbonate constraining layer.

Table 1 provides the materials used for the barrier layer and for the constraining layer.

The bPP in Table 1 (below) is prepared by pre-compounding the iPP (in Table 1 below) with 0.2 wt % quinacridonequinone (Sigma Aldrich Company).

TABLE 1

Barrier Layer Materials

| Barrier polymer | Trade Name | Density (g/cc) | Tc (° C.) | Tg (° C.) | MFR* |
|---|---|---|---|---|---|
| Propylene homopolymer (iPP) | Inspire114 | 0.9 | | | 0.5 |
| Polycarbonate (PC1) | APEC 1745 | 1.17 | | 172 | 17.0 |

*MFR-melt flow rate - g/10 min @ 230° C./2.16 kg

Multilayer films are prepared having 257 thin layers of alternating propylene-based polymer (either iPP or bPP as barrier layer) and PC1 (constraining layer) where the resulting final layer thicknesses provided by the final thicknesses to which the films are drawn down. The present multilayer film is made by a feedblock process as previously described and shown in FIG. 1.

The core component is made with A polymer (either iPP or bPP) and B polymer (constraining layer PC1), and is extruded by two ¾ inch (1.9 cm) single screw extruders connected by a melt pump to a coextrusion feedblock with an BAB feedblock configuration (as described above). The melt pumps control the two melt streams that are combined in the feedblock; by adjusting the melt pump speed, the relative layer thickness, that is, the ratio of A to B can be varied. The feedblock provides a feedstream to the layer multipliers as 3 parallel layers in a BAB configuration with B split into equal thicknesses of B layer on either side of A layer in the total A:B volume ratios shown in the tables. Then, seven layer multiplications are employed, each dividing the stream into 2 channels and stacking them to provide a final film having 257 alternating discrete microlayers. Skin layers of PC1 that are 34 volume percent (2×17% per single skin) of the final film are provided to each surface of the core component.

The extruders, multipliers and die temperatures are set to 240° C. for all the streams and layers of the multilayer products to ensure matching viscosities of the two polymer melts. The multilayer extrudate is extruded from a flat 14 inch (35.5 cm) die having a die gap of 20 mils to a chill roll having a temperature of 80° C. with almost no air gap between the die and chill roll and providing a relatively fast cooling of the film. The overall flow rate is about 3 lbs/hr (1.36 kg/hr).

The films are heat treated after coextrusion at 180° C. for 2 hours and 140° C. for 24 hrs.

Multilayer film structure is shown in Table 2 below.

TABLE 2

Multilayer Structure of iPP and bPP with PC as a confining layer

| Sample | A Layer | B Layer | Skin Material | Total Thickness (mil) | Ratio (A:B skin) | A&B Layer Thickness (nm) | Core-Total Layers |
|---|---|---|---|---|---|---|---|
| Comparative A | PC | PP | PC | 3 | 33:33:34 | 196 | 257L |
| Example 1 | PC | Beta PP | PC | 3 | 33:33:34 | 196 | 257L |

Embedded films are microtomed through the thickness at −75° C. with a cryo-ultramicrotome (MT6000-XL from RMC) and cross-sections are examined with an atomic force microscope (AFM) to visualize the layers and the morphology inside layers. Phase and height images of the cross-section are recorded simultaneously at ambient temperature in air using the tapping mode of the Nanoscope IIIa Multi-Mode scanning probe (Digital Instruments). Although there is some non-uniformity, the average layer thickness is observed to be quite close to the nominal layer thickness calculated from the film thickness, the composition ratio and the total number of layers.

FIG. 2a is a TEM of comparative film 1 (iPP/PC) with edge-on lamella visible in the iPP barrier layer. FIG. 2b is a TEM of inventive film 2 (bPP/PC) with in-plane lamella visible in the bPP barrier layer.

FIG. 3a is a TEM of comparative film 1 after heat treatment. The edge-on lamella are visible in the iPP barrier layer. FIG. 3b is a TEM of the inventive film 2 after heat treatment. In-plane lamella are visible in the bPP barrier layer.

Moisture permeability for a film structure having 3 materials (barrier polymer, confining polymer, and skin material) is given by:

$$P = \left(\frac{\phi_B}{P_B} + \frac{\phi_C}{P_C} + \frac{\phi_{skin}}{P_{skin}}\right)^{-1}$$

where $\emptyset_B$ is the volume fraction of barrier, $\emptyset_C$ is the volume fraction of confining polymer, and $\emptyset_{skin}$ is the volume fraction of skin, $P_B$ is the effective permeability of the barrier, $P_C$ is the permeability of the confining polymer and $P_{skin}$ is the permeability of the skin polymer.

Typical barrier films have skin layers or other layers that have such low barrier properties as not to contribute significantly to the overall barrier. As such, the barrier layer typically dominates the permeability of the film.

The moisture permeation measured through a film is defined as the Water Vapor Transmission Rate or WVTR and is related to the film permeability, P, and total thickness of the film, t, by WVTR=$P/t$ Therefore, microlayered barrier film having constraining layers and outside skin layers has a convoluted WVTR related to the total thickness of each material given by:

$$WVTR = \left(\frac{t_B}{P_B} + \frac{t_C}{P_C} + \frac{t_{skin}}{P_{skin}}\right)^{-1}$$

where
$t_B$ is the total thickness of barrier, $t_C$ is the total thickness of confining polymer, and $t_{skin}$ is the total thickness of skin.

WVTR Measurements at 38° C./100% RH iPP control permeability@40% crystal content=0.50 g-mil/100 in$^2$/day×15.5=7.75 g-mil/m$^2$/24 hr iPP control permeation(WVTR) for 1 mil film=7.75 g/m$^2$/24 hr PC control permeability=16.5 g-mil/100 in$^2$/day× 15.5=256 g-mil/m$^2$/24 hr PC control permeation(WVTR) for 1 mil film=256 g/m$^2$/24 hr

Comparative Example 1 (CE1)

CE1 is a film of 0.2525 vol fraction PC skin/0.495 vol fraction iPP barrier core/0.2525 vol fraction PC skin.

$1/P$=0.2525/256+0.495/7.75+0.2525/256=0.001+ 0.0639+0.001=0.0658

Effective moisture permeability=15.2 g-mil/m$^2$/24 hrs

Permeation(WVTR) for 3 mil film=$P$/thickness=15.2/3=5.07 g/m$^2$/24 hrs(bulk permeation iPP)

Comparative A

Comparative A is a 3 mil film that has microlayered iPP barrier and PC constraining layer in core and PC outside skins.

iPP permeability(257 layers,196 nm iPP thickness, 17 vol % PC/(49.5 vol % iPP/16.5 vol % PC)/ 17 vol % PC)=0.37 g-mil/100 sqin/day× 15.5=5.74 g-mil/sqm/day(~1.35×improvement in barrier CE1)

$1/P$=0.17/256+0.495/5.74+0.165/256+0.17/ 256=0.0006+0.0862+0.0006+0.0006=0.088

$P$=11.4 g-mil/m$^2$/24 hrs

Permeation(WVTR) for a 3 mil film is 3.79 g/m$^2$/24 hrs(microlayered IPP)

Example 1

Example 1 is a 3 mil film that has microlayered beta PP with PC constraining layers in core and PC outside skins.

iPP+beta nucleator=beta PP(or bPP)

betaPP permeability(257 layers,196 nm bPP thickness,17 vol % PC/(49.5 vol % bPP/16.5 vol % PC)/17 vol % PC))=0.23 g-mil/100 in$^2$/day× 15.5=3.56 g-mil/m$^2$/24 hrs(~2.2×improvement in barrier over bulk permeation)

$1/P$=0.17/256+0.495/3.56+0.165/256+0.17/ 256=0.0006+0.139+0.0006+0.0006=0.1408

$P$=7.10 g-mil/m$^2$/24 hrs

Permeation (WVTR) for Example 1 3 mil film is 2.37 g/m$^2$/24 hrs(microlayered, bPP)

The properties for the foregoing films are provided in Table 3 below.

TABLE 3

| Example | Film Structure | Process | WVTR of film (g/m$^2$/24 hr) (38° C./100% RH) | Permeability of film (g-mil/m$^2$/24 hr) (38° C./100% RH) | Permeability of barrier (g-mil/m$^2$/24 hr) (38° C./100% RH) |
|---|---|---|---|---|---|
| Monolayer iPP | 100 vol % iPP | 1 mil film extruded | 7.75 | 7.75 | 7.75 |
| Monolayer PC | 100 vol % PC | 1 mil film extruded | 256 | 256 | 256 |
| Comparative Example 1 | 25.25 vol % PC/49.5 vol % iPP/25.25 vol % PC | 3 mil coextruded | 5.07 | 15.2 | 7.75 |
| Comparative A | 17 vol % PC/(49.5 vol % iPP/16.5 vol % PC)$_n$/17 vol % PC, n = 255, PP = 196 nm | 3 mil microlayer coextruded | 3.79 | 11.4 | 5.74 |
| Example 1 | 17 vol % PC/(49.5 vol % beta PP/16.5 vol % PC)$_n$/17 vol % PC, n = 255, PP = 196 nm | 3 mil microlayer coextruded | 2.37 | 7.1 | 3.56 |

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A coextruded multilayer film comprising:
   a core component comprising from 15 to 1000 alternating layers of layer A and layer B;
   layer A having a thickness from 10 nm to 1000 nm and comprising a beta-propylene-based polymer having a crystallization temperature ($T_1c$), layer A comprising truncated spherulites;
   layer B comprising a second polymer having a glass transition temperature ($T_2g$), wherein $T_1c<T_2g$; and
   layer A has an effective moisture permeability less than 6.2 g-mil/100 in$^2$/day.

2. The coextruded multilayer film of claim 1 wherein the Layer A comprises at least 80% of beta-propylene-homopolymer.

3. The coextruded multilayer film of claim 1 wherein the Layer A comprises at least 90% of beta-propylene-homopolymer.

4. The coextruded multilayer film of claim 1 wherein the Layer A comprises at least 95% of beta-propylene-homopolymer.

5. The multilayer film of claim 1 wherein layer A has a thickness from 10 nm to 500 nm.

6. The multilayer film of claim 1 wherein layer A comprises a beta-propylene-homopolymer with a $T_1c$ from 100° C. to 130° C.

7. The multilayer film of claim 1 wherein the beta-propylene-homopolymer has a melt flow rate from 1.5 g/10 min to 2.5 g/10 min.

8. The multilayer film of claim 1 wherein the second polymer is selected from the group consisting of a polycarbonate and a cyclic olefin polymer.

9. The multilayer film of claim 1 wherein layer A comprises a beta-propylene-homopolymer with a $T_1c$ from 100° C. to 130° C. and a melt flow rate from 1.5 g/10 min to 2.5 g/10 min; and
   layer B comprises a polycarbonate with a $T_2g$ greater than 130° C.

10. The multilayer film of claim 1 wherein $T_2g-T_1c$ is greater than 20° C.

11. The multilayer film of claim 1 wherein layer A has a thickness from 10 nm to 50 nm and layer A has an effective moisture permeability less than 5.0 g-mil/m$^2$/24 hrs.

12. The multilayer film of claim 1 wherein the core component has a thickness from 2.5 micrometers to 250 micrometers.

13. The multilayer film of claim 1 comprising skin layers.

14. The multilayer film of claim 13 wherein at least one skin layer is selected from the group consisting of a propylene-based polymer and an ethylene-based polymer.

* * * * *